United States Patent [19]
Conner

[11] Patent Number: 6,145,986
[45] Date of Patent: *Nov. 14, 2000

[54] COMBINATION GLASSES AND GLASS CASE

[75] Inventor: William A. Conner, San Diego, Calif.

[73] Assignee: Microvision Optical, Inc., San Diego, Calif.

[*] Notice: This patent is subject to a terminal disclaimer.

[21] Appl. No.: 09/351,245

[22] Filed: Jul. 12, 1999

Related U.S. Application Data

[62] Division of application No. 09/130,550, Aug. 6, 1998, Pat. No. 5,929,967.

[51] Int. Cl.⁷ .................................................... G02C 1/00
[52] U.S. Cl. ........................................ 351/158; 206/5
[58] Field of Search ........................... 351/41, 158; 206/5

[56] References Cited

U.S. PATENT DOCUMENTS

| | | | |
|---|---|---|---|
| 5,929,967 | 7/1999 | Conner | 351/158 |
| 5,949,515 | 9/1999 | Hoshino | 351/158 |

*Primary Examiner*—Huy Mai
*Attorney, Agent, or Firm*—Frank D. Gilliam

[57] ABSTRACT

A case for glasses in the shape of a writing instrument having a hollow barrel portion for receiving a pair of small glasses. The case can take a plurality of different cross-sectional configurations. The writing instrument can be a pen or pencil at one end of the hollow barrel with an opening with a removable cover at the opposite end. The glasses for use therewith can be small conventional glasses or specially designed glasses that can have both telescopic frames and telescopic temples.

19 Claims, 3 Drawing Sheets

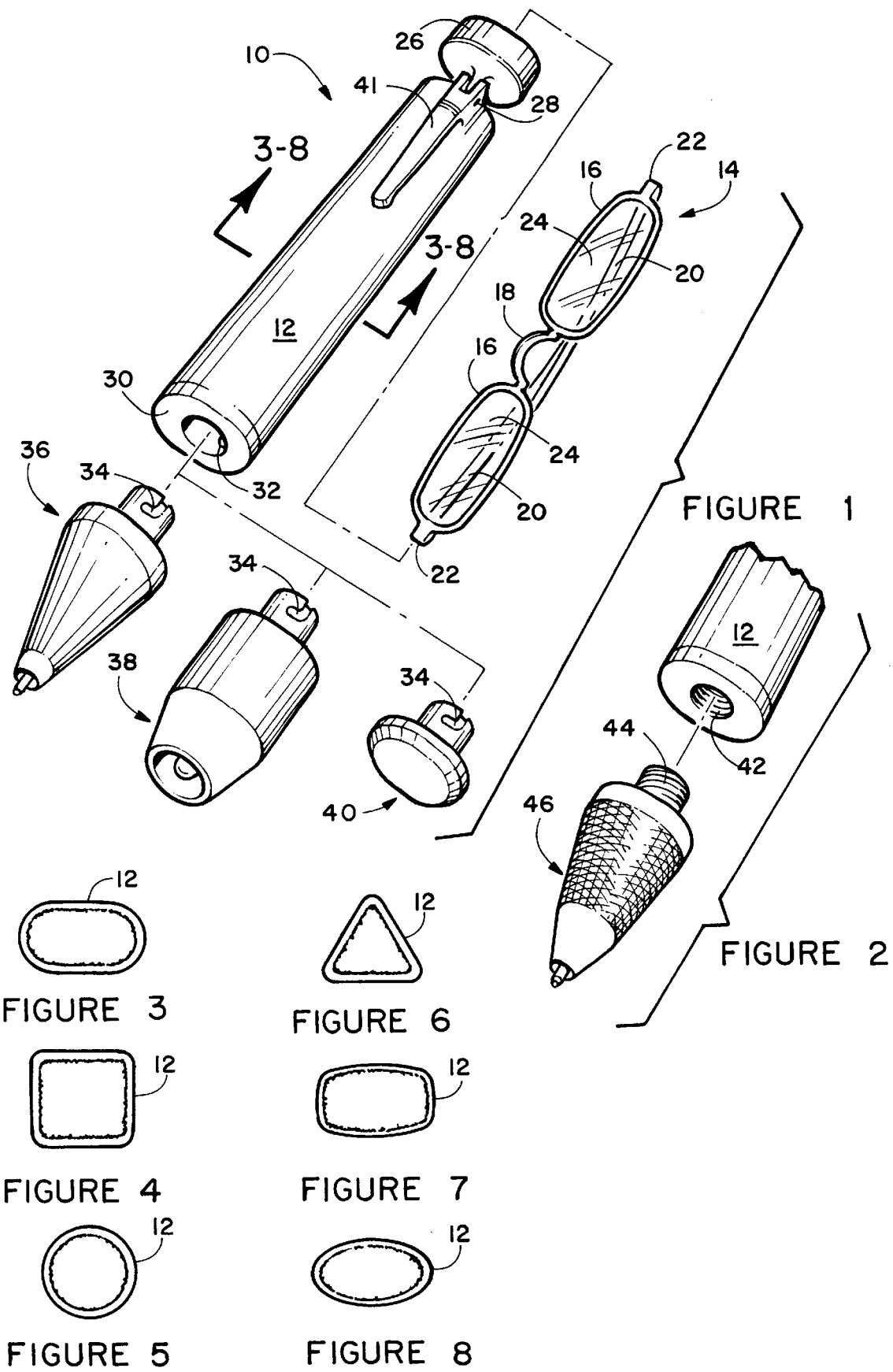

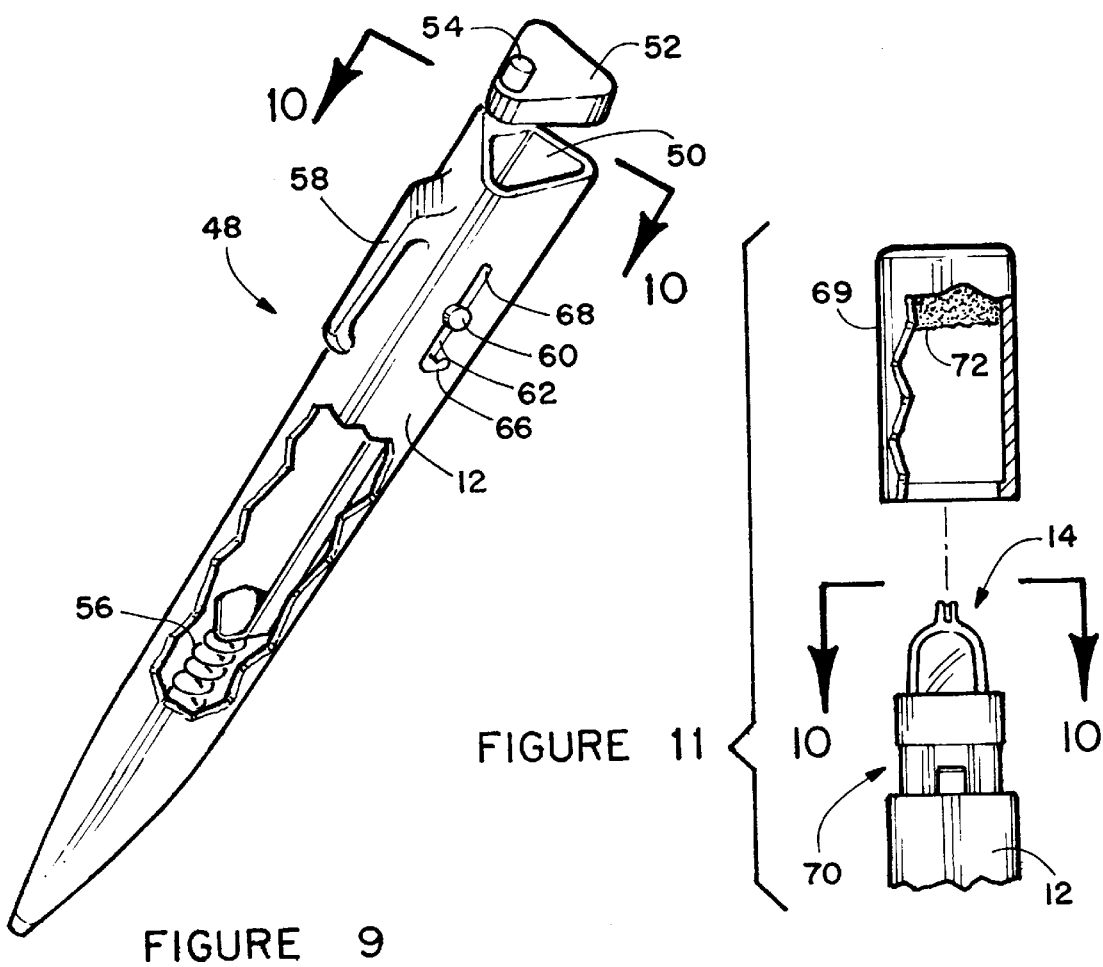
FIGURE 9
FIGURE 11
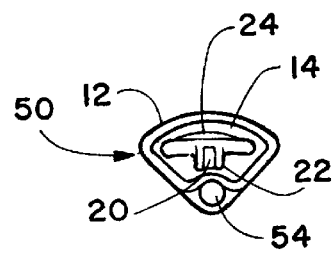
FIGURE 10
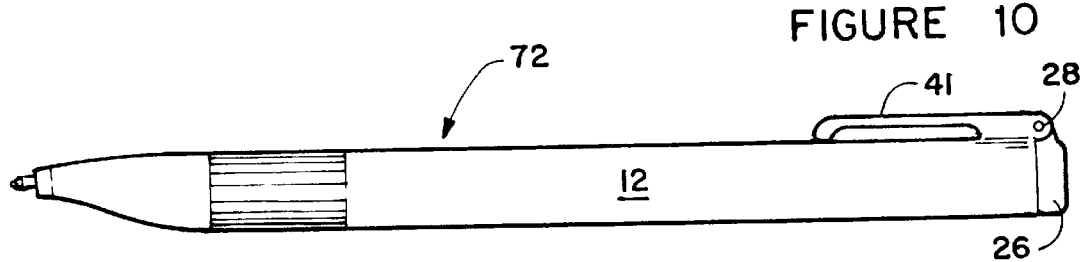
FIGURE 12

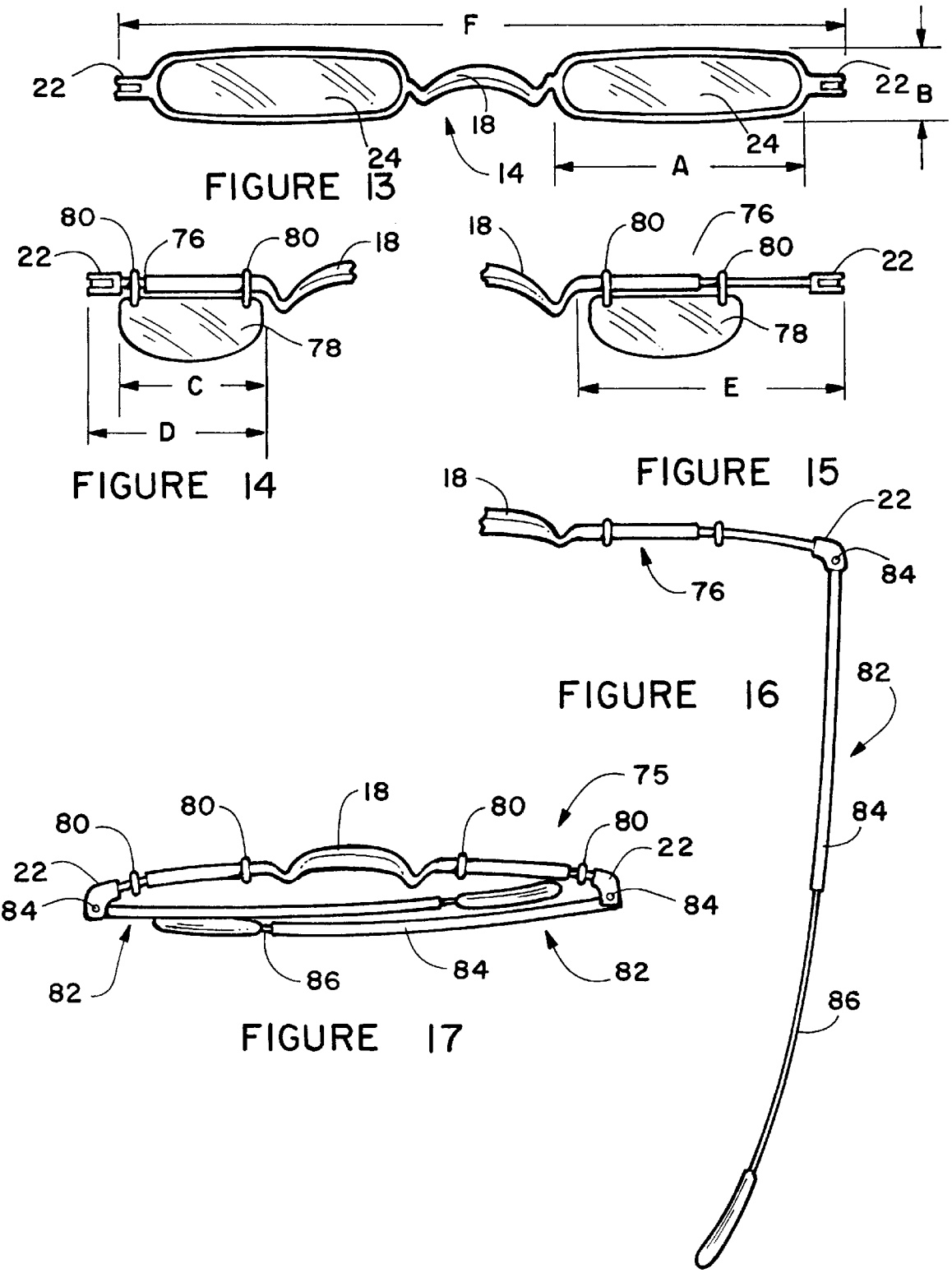

COMBINATION GLASSES AND GLASS CASE

This application is a divisional of application Ser. No. 09/130,550 filed on Aug. 6, 1998, now U.S. Pat. No. 5,929,967.

FIELD OF THE INVENTION

The instant invention is directed to compact cases for conventional and foldable glasses, and more particularly to a case that is non-intrusive and easy to carry on the person.

BACKGROUND OF THE INVENTION

Spectacles or as commonly referred to as glasses have been around for a considerable length of time for the visually impaired. Glasses have been made as small as practical or have various foldable elements to reduce the physical size for carry around convince.

Foldable glasses include frames that fold in the middle and temples that fold at one or more locations along their length to reduce the physical size of the glasses for transport.

Typical state of the art compact folding glasses can be found in the following United States Patents: U.S. Pat. No. 2,419,303 issued to inventor W. G. Vasey on Apr. 22, 1947 which includes folding frames and temples; U.S. Pat. No. Des. 165,721 issued to M. Rand on Jan. 22, 1952 which shows folding frames and temples; U.S. Pat. No. 2,814,968 issued to W. S. Dixon, Jr. on Dec. 3, 1957 which shows foldable frames and temples; U.S. Pat. No. 4,681,410 issued to Al W. Paulsen on Jul. 21, 1987 which teaches a foldable frame and a showing of a different type folding temples; U.S. Pat. No. 4,768,872 by Michael Fraslle et al. On Sep. 6, 1988 which teaches a temple with an extendable length; U.S. Pat. No. 5,384,604 by Chang which teaches collapsible glasses which has foldable frames and fold along the temples at various locations; and U.S. Pat. No. 5,532,766 by David G. Maleer et al. which teaches foldable frames and temples.

There is a continuing need for small-un-abstruse cases for small conventional and the small folding glasses mentioned above.

SUMMARY OF THE INVENTION

The present invention is directed to small cases for small glasses that can be easily carried on the person of the user. The glass case of the invention is directed to a case having the general appearance of a writing instrument such as, a pen or pencil.

One embodiment of the invention includes removable accessories that can be adapted to one end of the case. These accessories comprise a pen, a pencil, flash light and a end cap any one of which can be removably attached to one end of the case. The other end of the case has an end cap that can be removed to have access to the small glasses within the hollow center of the case. Other glass accessible end caps can be hinged or pivotally attache to the end of the case to allow removal and storage for the small glasses.

Another embodiment the glass case of the invention is in the general form of a conventional pen or pencil including a writing instrument with a hollow barrel portion above the writing instrument mechanism. The pen configured glass case includes a conventional pocket clip at the glasses receiving end of the hollow barrel portion. In this embodiment the writing instrument mechanism is offset from the longitudinal center line of the pen configured glass case as is the hollow portion for containing the glasses.

In one of the pen configured glass case the writing mechanism is translatable from a deployed for writing position and a stowed non writing position.

In one embodiment of the glass case of the invention the bottom surface of the hollow glass case containing portion includes a biasing means that elevates the glasses for easily removable when the restraining cap closing the hollowing opening is cleared from the opening.

The general cross-sectional appearance of the case takes many forms, namely, oblong, rectangular, circular, triangular, square, oval and first opposing curvilinear opposing sides and second curvilinear opposing side normal to the first opposing sides.

In one embodiment of the small glasses that fit in the above described case includes telescoping frame sections on each side of the nose piece and telescoping temples. In this embodiment, the lens are translatable to conform to the distance between the eyes of the user and are rotatable about their frame attachment so as to provide for user lens tilt adjustment or can be in a fixed position.

The principal object of this invention is to provide a glass case for holding a pair of small glasses that is convenient to carry on the person and is non-obtrusive in appearance.

Another object of this invention is to provide a case for small glasses in the form of a writing instrument.

Another object of this invention is to provide a compact pair of glasses that fit in a small cross-sectional housing.

Yet another object of this invention is to provide a glass case in the general form of a either a writing instrument that includes either a pen, pencil, flashlight or end closure.

Yet another object of this invention is to provide a glass case in the form of a writing instrument that includes an interchangeable pen, pencil or flashlight tip at one end.

Still another object of this invention is to provide a pair of glasses that will fit into a case having the general appearance of a writing instrument such as a pen or pencil that has telescoping frame portions on each side of the nose piece of the glasses and has telescoping temples for length adjustment.

These and other objects and features will become apparent when the specifications are read in view of the following drawing Figures.

BRIEF DESCRIPTION OF THE DRAWING FIGURES

FIG. 1 is an exploded perspective showing of one embodiment of the glass case of the invention including various interchangeable elements with bayonet attachment means and small glasses to fit into the case;

FIG. 2 is a partial showing of the glass case of FIG. 1 with threaded attachment means;

FIG. 3 is a first embodiment showing of FIG. 1 taken along line 3–8;

FIG. 4 is a second embodiment showing of FIG. 1 taken along line 3–8;

FIG. 5 is a third embodiment showing of FIG. 1 taken along line 3–8;

FIG. 6 is a fourth embodiment showing of FIG. 1 taken along line 3–8;

FIG. 7 is a fifth embodiment showing of FIG. 1 taken along line 3–8;

FIG. 8 is a sixth embodiment showing of FIG. 1 taken along line 3–8;

FIG. 9 is a partial cutaway showing of a third embodiment of the glass case of the invention with the housing having a cap to enclose the hollow portion of the housing;

FIG. 10 is a top plan view showing of the FIGS. 9 and 11 embodiment with the top of the barrel housing removed showing glasses in the hollow portion;

FIG. 11 is a patrial showing in cutaway of a fourth embodiment of the glass case of the invention.

FIG. 12 is a side view of a fifth embodiment of the glass case of the invention;

FIG. 13 is a partial showing of a second embodiment of glasses designed to fit in the glass case of the invention;

FIG. 14 is a partial showing of a third embodiment of glasses designed to fit in the glass case of the invention with the telescoping frame is a stowed minimum length position;

FIG. 15 is a partial showing of the third embodiment of glasses designed to fit in the glass case of the invention with the telescoping frame in a deployed maximum length position;

FIG. 16 is a partial showing of the temples of glasses designed to fit into the glass case of the invention in a fully telescoped maximum length position; and FIG. 17 is a showing of the second embodiment of the glasses designed to fit into the glass case of the invention with telescoping portions of both the frame and temple in a stowed minimum length position.

DETAILED DESCRIPTION OF THE FIRST PREFERRED EMBODIMENT OF THE INVENTION

Referring now specifically to drawing FIGS. 1, 2, 7 and 12 the glass case 10 depicted in drawing FIGS. 1, 2 and 12 is shown having a hollow housing 12 with an oval cross-section as depicted in drawing FIG. 2. The hollow housing 12 has suitable area for receiving a pair of small glasses 14. The small glasses 14 have the usual frame 16, interconnecting nose piece 18, a pair of temples 20 hinged at each end 22 of the frame 16 and a pair of lens 24.

One end of the hollow housing includes a first embodiment of a closure member in the form of a cap 26 that encloses the open of the hollow barrel when the glasses 14 are stored for non use and pivot to an end open hollow barrel about the pivot 28 for selective access to the small glasses within. The cap 26 is slightly elevated with a hollow center so that the glasses can extend beyond the end of the hollow barrel for ease of removal for use.

The end 30 of the hollow body includes a pin 32 means for connecting to a bayonet locking means 34 of one of a plurality of different removable tips, also see drawing FIG. 2, a writing instrument 36, flashlight 38 or end cap 40. A clip 41 is a conventional means for clipping the case 10 to the pocket of the user for transport.

Referring now specifically to drawing FIG. 2, the hollow barrel includes threads 42 which mate with threads 44 of a second embodiment of a writing instrument. The writing instrument 46 is of the type that when knurled surface 48 is rotated the writing instrument is exposed for use or retracted for storage.

Referring now specifically to drawing FIGS. 3–8, various configured cross-sections of the hollow barrel are shown.

FIG. 3 has an oval configuration.

FIG. 4 has a square configuration.

FIG. 5 has a tubular configuration.

FIG. 6 has a triangular configuration.

FIG. 7 has a curvilinear edged rectangular configuration.

FIG. 8 has a oval configuration.

Referring now specifically to drawing FIGS. 9, 10 and 11, a second and third embodiment of the glass case 48 of the invention is shown in partial cutaway. The hollow portion 50 of the case has a modified triangular configuration as shown in drawing FIG. 6. The end closure 52 for retaining the small glasses 14, see drawing FIG. 10, within the hollow barrel pivots about pivot 54 for exposing the inner hollow barrel which is a of modified triangular configuration. At the bottom of the hollow barrel is a bias means shown as a spring 56 that is compressed by the frame of the small glasses 14 when they are inserted and forced inward against the bias if the spring as shown in the drawing FIG. 10 and the cap 52 is then rotated over the hollow barrel 12. It should be understood that any bias means such as, foam rubber or the like could be employed as the bias means. When the cap is rotated with the small glasses within the hollow barrel the spring bias 56 elevates the small glasses so that they can be removed from the hollow barrel with ease. A user garment attachment clip 58 is shown molded into the hollow barrel. When the button 60 translatable along a channel 62 and lockable in the maximum down position in offset channel 66. The button is in a maximum upward position at location 68 the writing instrument is in a stowed position wherein it is concealed within the hollow barrel and when the bottom is translated and locked into offset channel 66 the writing instrument is locked into a use position extending from the hollow barrel.

Drawing FIG. 11 depicts a different cap 68 for covering the opening in hollow barrel 12 when in place over the end of the hollow barrel portion. The cap 68 makes a friction fit with the distal end 70 of the hollowing housing 12 for maintaining the small glasses within the hollow barrel. The cap has a resilient bias means 72 for engaging the surface of the small glasses extending from the hollow barrel section to prevent movement of the small glasses within the hollow barrel when being transported to prevent breakage. Drawing FIG. 10 depicts a plan view of the glasses within the hollow portion of the case taken along line 10—10 of drawing FIG. 11.

Drawing FIG. 12 depicts a side view showing of a fourth embodiment 72 of the glass case of the invention. This showing is similar to that shown in drawing FIG. 1 except the writing instrument 74 is offset from the center line through the length of the hollow barrel 12 of the glass case and can be retractable as depicted in drawing FIG. 9 or can be retractable in any other conventional manner.

Referring now specifically to drawing FIG. 13, the small glasses 14 are shown in detail. The width A of the glasses have a range of 12.7 mm to 57.00 mm (mm=millimeters). The width A being ideally about 43 mm. The height B of the lens and frame portion surrounding the lens has a width of from 10 mm to 32 mm. The width being ideally about 15 mm. The overall length F of the small glasses is in the range of 76 mm to 152 mm. Ideally the overall length of the small glasses of the invention will be approximately 127 mm.

Drawing FIGS. 14–17 depict on side of a second embodiment of small glasses 75 of this invention. Drawing FIGS. 14–16 depict only one side of the small glasses 75 of drawing FIG. 17. It should be understood that the opposite side of the small glasses 75 are identical in detail to that side shown in drawing FIG. 17.

Drawing FIGS. 14 and 15 depicts a telescoping frame portion 76 that translates from the FIG. 14 stowed position to the drawing FIG. 15 maximum deployed position. It should that the frame portion can be translated to an infinite number of positions between the drawing FIG. 14 stowed position and the drawing FIG. 15 fully deployed position. The width C of the lens 78 can be from 12.7 mm to 30 mm.

Ideally the width will be approximately 25.5 mm. The distance D is in the range of from 30 mm to 35 mm and distance E can be in the range of 31.5 mm to 51 mm. Ideally distance D will be approximately 28.5 and distance E will be approximately 45 mm.

The lens 78 of the embodiment of the small glasses of drawing FIGS. 14–17 are pivot able through 360 degrees relative to the frame to which their are attached for user selected angular positioning for use. The lens 72 are attached via an "O" ring type connector 80 which allows the telescoping portion of the frame to freely translate relative to the lens connection to allow frame extension. The "O" type connector 80 can be a close tolerance fit to the frame or can be constructed of resilient material such as a conventional rubber type "O" ring used for compression sealing.

Referring now specifically to drawing FIG. 16, the temples 82 pivotally attach to the frame 76 at pivot 84. The temples include telescopic portions 84, 86 for decreasing the over all length of the temple for storage as seen in drawing FIG. 17 and extendable for various required temple lengths between the drawing FIG. 17 stowed position to the drawing FIG. 16 deployed position. The temples extend approximately 60 mm between minimum length and maximum length positions.

The glass cases of the invention have a maximum width in the range of 16 to 64 mm and a preferred width of 27 mm. The length of the glass cases of the invention have a maximum length in the range of 76 to 178 mm and a preferred length of 127 mm.

Therefore, it should be understood that the particular embodiments shown in the drawings and described within the specifications are for the purpose of example and should not be construed to limit the invention which will be described in the claims below. Now that a number of examples of the apparatus of the invention have been given, numerous other applications should be evident to one skilled in the art. Further, it is evident that those skilled in the art may now make numerous uses and modifications of the specific embodiments described herein. It should be obvious that the various members described may be made from a variety of materials and using a wide combination of dimensions. Consequently, the invention is to be construed as embracing each and every novel feature and novel combination of the features present in or possessed by the apparatus described herein.

What is claimed is:

1. A case having internal storage space for storage of removable contents comprising:

said case having the configuration of a writing instrument;

said case having a first and second end with a hollow portion therebetween for receiving removable contents;

said first end consisting being of a configuration selected from one of the following elements a writing instrument, a flashlight and a flat end closure; and said second end having a closure means for concealing said contents in said hollow portion when said closure means is closed and allowing removal of said contents when said closure means is open.

2. The invention as defined in claim 1 wherein said case has a length of approximately 127 mm.

3. The invention as defined in claim 1 wherein said writing instrument, flashlight, flat end closure and said second end have the same cross-sectional configuration as said case.

4. The invention as defined in claim 1 wherein said writing instrument, flashlight and flat end surface are removable from said case and selectively interchangeable on said first end.

5. The invention as defined in claim 1 wherein said writing instrument is a pen.

6. The invention as defined in claim 1 wherein said writing instrument is a pencil.

7. The invention as defined in claim 1 wherein the cross-section of said case is oval.

8. The invention as defined in claim 1 wherein the cross-section of said case is substantially rectilinear.

9. The invention as defined in claim 1 wherein the cross-section of said case is substantially square.

10. The invention as defined in claim 1 wherein the cross-section of said case is curvilinear.

11. The invention as defined in claim 10 wherein the cross-section of said case is substantially circular.

12. The invention as defined in claim 1 wherein the cross-section of said case is substantially circular.

13. The invention as defined in claim 1 wherein the cross-section of said case is substantially triangular.

14. The invention as defined in claim 1 wherein the writing instrument is translatable between a use and a non-use position.

15. The invention as defined in claim 1 wherein the distal end of said case remote from said writing instrument has a pivotal cover over said hollow portion.

16. The invention as defined in claim 1 wherein the distal end of said case remote from said writing instrument has a rotatable cover over said hollow portion.

17. The invention as defined in claim 1 wherein the distal end of said case remote from said writing instrument has a removable cover over said hollow portion.

18. The invention as defined in claim 1 wherein said writing instrument, flashlight and flat end closure are removable from and attachable to said case by a threaded connection.

19. The invention as defined in claim 1 wherein said writing instrument, flashlight and flat end surface are removable from and attachable to said case by a bayonet connection.

\* \* \* \* \*